June 27, 1933.  C. M. TICHENOR  1,915,630
SECURING DEVICE
Filed Feb. 16, 1931

Inventor
Carl M. Tichenor.
By W. H. Beatty
Atty.

Patented June 27, 1933

1,915,630

UNITED STATES PATENT OFFICE

CARL M. TICHENOR, OF NORTH MUSKEGON, MICHIGAN, ASSIGNOR TO UNITED RESEARCH CORPORATION, A CORPORATION OF DELAWARE

SECURING DEVICE

Application filed February 16, 1931. Serial No. 516,112.

My invention relates to devices for securing members together and has especial relation to securing means operating through apertures in the members to be secured.

Heretofore where members have been provided with apertures for a bolt to secure them together, difficulty has often been experienced where the apertures, due to defects in manufacture, were slightly off center, as this has necessitated the use of a bolt somewhat smaller than one of the apertures and consequently when the members are subjected to severe vibration, a certain amount of lateral shifting between them could not be prevented even after the bolt was secured.

It is an object of my invention to overcome this disadvantage by providing a centering element for cutting into one of the members to be secured and engaging the bolt for preventing lateral movement of the latter in the aperture in said member.

Other objects and advantages will appear as the description proceeds.

Figure 1:
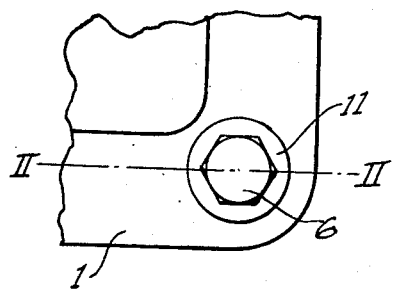
Figure 5:
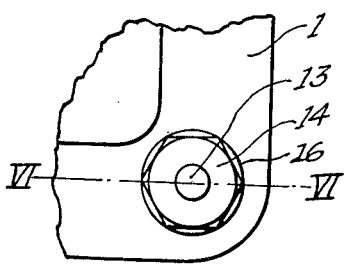
Figure 2:
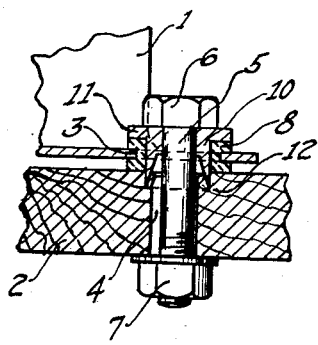
Figure 6:
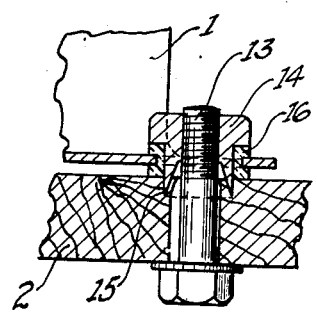
Figure 3:
Figure 4:
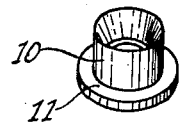

Referring to the accompanying drawing, Fig. 1 is a plan view of a securing device embodying my invention, the secured members being broken away. Fig. 2 is a sectional view on the line II—II of Fig. 1. Figs. 3 and 4 are detail views of a cushion and a centering element respectively shown in Fig. 2. Fig. 5 is a plan view of a modified form of my invention, and Fig. 6 is a sectional view on line VI—VI of Fig. 5.

Referring to the drawing in detail, and particularly to Figs. 1 to 4, the members 1 and 2 which are secured together are provided with apertures 3 and 4, through which extends a bolt 5 having a head 6 and a nut 7.

A cushion 8, which may be of rubber, leather or other similar material having vibration insulating properties, is received in the aperture 3, fitting about a centering element 10. The centering element has a shoulder 11 engaging the cushion and is provided with a circular cutting edge 12 which penetrates into the member 2.

The aperture 4 is of slightly larger size than the bolt 5 to permit the assembly of the bolt when the two apertures are slightly off center, as in practice it often happens that due to conditions in manufacture the two apertures cannot be conveniently brought into perfect alignment. On the tightening of the bolt the edge 12 of the centering element is forced a substantial distance into the relatively softer material of the member 2, which may be of wood. After the bolt is tightened, as shown, the centering element 10 is fixed rigidly in position, and neither it nor the bolt can move laterally. Consequently shifting between the members 1 and 2 is prevented. The securing device therefore operates as satisfactorily as if the apertures in the members 1 and 2 were perfectly aligned and a bolt fitted snugly therein.

In the modification shown in Figs. 5 and 6 the bolt 13 is in a position reversed to that shown in Figs. 1 and 2, and a nut 14 is provided with a reduced portion extending through the aperture in the member 1 and terminating in a cutting edge 15 which penetrates the member 2. A reduced portion of the nut 14 is surrounded by a cushion 16. The advantages of this construction are apparent from the above description of the other modification of the invention.

My invention is not limited to the specific details of the constructions illustrated and described. For instance, the centering element 10 may be made in one piece with the bolt head 6, in which case it would have a shape somewhat similar to the nut 14. Again, the cushion 8 may be omitted where it is unnecessary to prevent the transmission of vibration between the members 1 and 2, the cushion being provided chiefly for use in the construction of radio receiving sets and similar apparatus. When the cushion is omitted the aperture 3 will be made small enough to prevent undesired lateral movement of the member 1. A substantial range of equivalents is contemplated within the scope of the appendd claims.

I claim as my invention:

1. The combination of a pair of apertured members, means including a bolt extending through the apertures in said members for securing them together, both of said apertures being of substantially larger diameter than said bolt, a centering element on said bolt extending through the apertures in one of said members and having a cutting edge for penetrating the other member for a substantial distance when said bolt is tightened and an annular cushion in the former aperture, surrounding said centering element and spacing said members apart.

2. In a securing device, the combination of a pair of members having apertures therein located slightly off center with respect to each other, and means including a nut and a bolt for securing said members together, the aperture in one of said members being slightly larger than the bolt, said nut extending through and fitting snugly in the aperture in the other member and having an edge for penetrating said one of said members on the tightening of said bolt whereby said members are prevented from relative lateral shifting movement.

3. The combination of a pair of apertured members, one having an opening accurately positioned, the other having an opening less accurately positioned, a securing member passing through both of said openings, and an auxiliary member having a cutting edge, adapted to fit one of said openings and to cut into the other member to provide means for positioning said members with respect to each other with a high degree of accuracy.

4. The combination of a pair of apertured members, a securing member passing through both of said openings, an auxiliary member having a cutting edge, adapted to fit one of said openings and to cut into the other member to provide means for positioning said members with respect to each other with a high degree of accuracy, and means comprising said auxiliary member for accurately positioning said securing member in the aperture in one of said apertured members, the body of said securing member being smaller than the aperture in the other of said apertured members.

CARL M. TICHENOR.